(12) United States Patent
Low et al.

(10) Patent No.: US 6,316,722 B1
(45) Date of Patent: Nov. 13, 2001

(54) VENTED PEDESTAL FOR ELECTRONICS HOUSING

(75) Inventors: Andrew Gordon Low, Southlake; Joseph C. Perry, Colleyville, both of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/516,535

(22) Filed: Mar. 1, 2000

(51) Int. Cl.⁷ ..................................................... H02G 9/00
(52) U.S. Cl. .................................... 174/38; 174/39; 52/3; 361/364
(58) Field of Search .......................... 174/38, 39, 17 CT, 174/58, 59, 60, 17 VA, 37; 220/3.3; 361/364, 690, 692, 693, 641; 52/3

(56) References Cited

U.S. PATENT DOCUMENTS 3,604,835 * 9/1971 Hamilton ........................... 174/60 X
5,978,217 * 11/1999 Kerrigan et al. ...................... 361/694
6,198,041 * 3/2001 Leschinger et al. .................... 174/38

FOREIGN PATENT DOCUMENTS

815337 * 6/1959 (GB) ...................................... 174/38
1243966 * 8/1971 (GB) ...................................... 174/38

* cited by examiner

Primary Examiner—Dean A. Reichard
Assistant Examiner—Dhirv R Patel

(57) ABSTRACT

A vented pedestal for supporting a housing that encloses electronic components and connectors has top and bottom ends, a vertical passage and a peripheral wall. An inwardly extending recess in the peripheral wall adjacent the top end has a downwardly facing recess upper wall and a recess bottom wall. The recess upper wall has vent openings therein, and the recess bottom wall is shaped to enhance air flow into the vent openings while minimizing the possibility of debris collecting in the recess.

12 Claims, 7 Drawing Sheets

VENTED PEDESTAL FOR ELECTRONICS HOUSING

BACKGROUND OF THE INVENTION

This application relates to the art of pedestals and, more particularly, to pedestals for supporting housings in which electronic components and connectors are located. The invention is particularly applicable for use in supporting a ventilated housing that encloses electronics and connectors for fiber optic cables, and will be described with specific reference thereto. However, it will be appreciated that the invention has broader aspects and can be used for supporting other types of ventilated housings.

Pedestals and housings of the type described commonly are installed in residential areas where they are exposed to the weather, windblown debris, leaves and grass clippings. Ventilation of the housing is desirable to cool electronic components and to minimize condensation of moisture. It would be desirable to have a pedestal and housing arrangement that provides good air flow while minimizing the possibility that the air intake vents will become blocked or permit the entry of moisture and debris.

SUMMARY OF THE INVENTION

A hollow pedestal has top and bottom ends, a vertical passage, a peripheral wall, an outer periphery and a longitudinal axis. An inwardly extending recess in the peripheral wall adjacent the top end has a downwardly facing inclined recess top wall and a recess bottom wall. The downwardly facing inclined recess top wall has vent openings therein for providing inflow of ventilation air which travels upwardly through a housing that is supported on the pedestal. The recess bottom wall is curved to enhance intake and upward flow of air, and to minimize accumulation of debris within the recess.

In a preferred arrangement, the recess top wall slopes downwardly from the pedestal outer periphery at an angle less than 30°. In a most preferred arrangement, this angle has been approximately 22°. With this arrangement, the vertical component of the inclined recess upper wall and the air intake vent openings therein is very small to minimize the possible entry of grass clippings, windblown debris, or windblown rain and snow.

The recess bottom wall preferably is curved and slopes downwardly to intersection with the outer periphery of the pedestal so that any moisture or debris falling thereon will be removed by gravity or wind forces, or by vibration of the pedestal due to wind forces.

The pedestal preferably has opposite external vertical channels therein through which cables may extend for supplying communications services to a residence. At least the upper portions of the vertical external channels are closed by cover plates that also have vent openings therein and match the configuration of the pedestal periphery including the ventilation recesses.

It is a principal object of the present invention to provide an improved hollow support pedestal having vent openings therein for providing flow of air into the pedestal and upwardly through a housing supported on the pedestal.

It is also an object of the invention to provide a pedestal having vent openings located in a recess that is shaped to minimize the possibility of the vent openings becoming blocked by windblown debris or grass clippings.

It is another object of the invention to provide a pedestal with vent openings located in a recess that is shaped to enhance the flow of air into the vent openings.

It is a further object of the invention to provide a pedestal with vent openings that are located in a manner that minimizes the possibility of windblown rain or snow from entering the vent openings.

DESCRIPTION OF A PREFERRED EMBODIMENT

Figure 1:
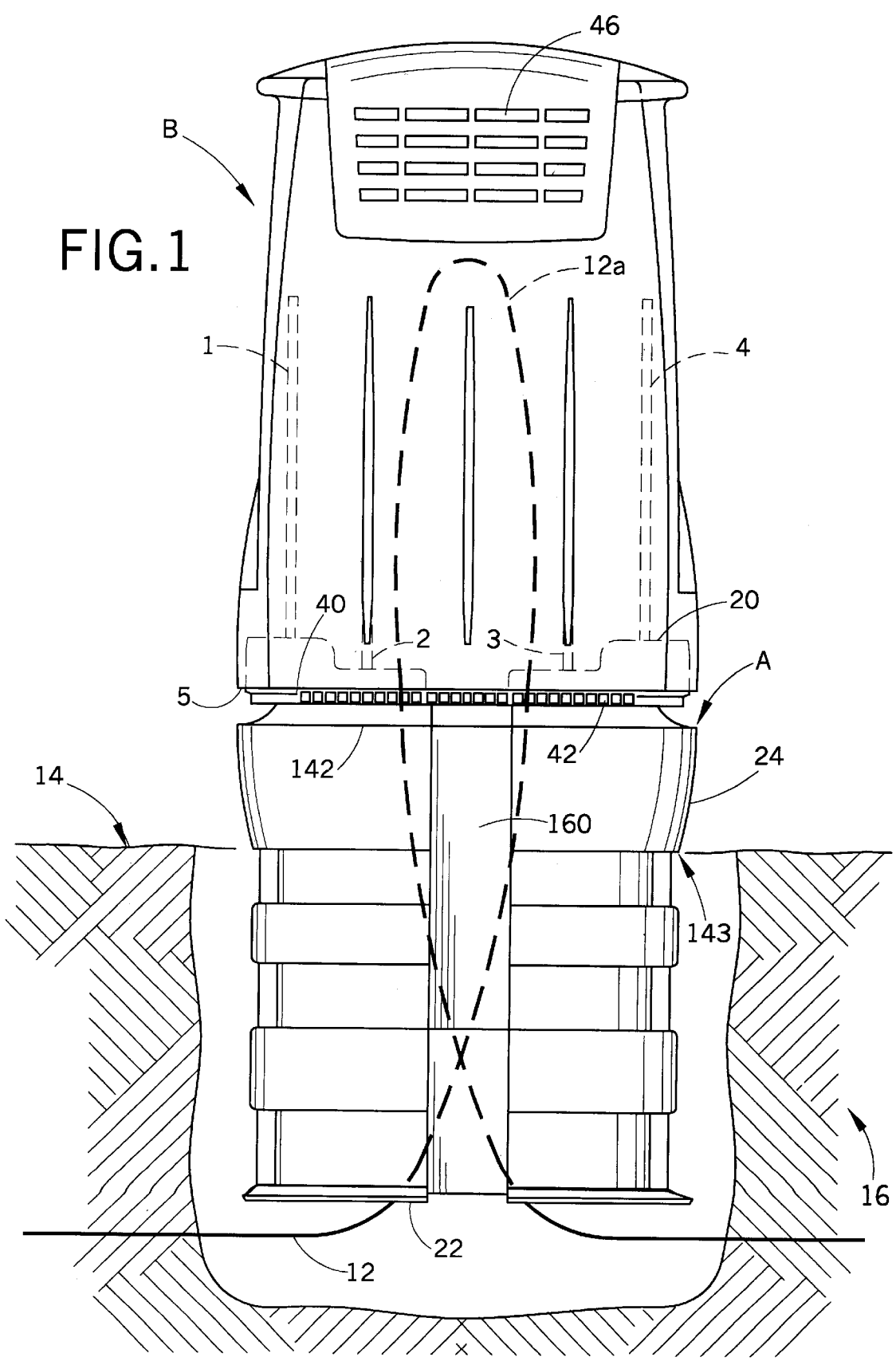
FIG. 1 is an elevational view of a pedestal in accordance with the present application installed in the ground and having a housing supported thereon.

Referring now to the drawing, wherein the showings are for purposes of illustrating a preferred embodiment of the invention only and not for purposes of limiting same, FIG. 1 shows a fiber optic cable 12 extending along a trench below the surface 14 of the earth 16. The cable and trench extend past residences that are supplied with communications services through the fiber optic cable.

A hollow pedestal A is buried in the earth with only its top end portion exposed above earth surface 14. A domed housing B that encloses electronics and connections is supported on pedestal A. Suitable releasable latches are provided for releasably locking housing B to pedestal A in a known manner. Strictly by way of example and not by way of limitation, pedestal A may have a length of approximately 25.183 inches and a width across its opposite sides of approximately 20 inches. The pedestal is buried with the top end portion thereof extending above earth surface 14, as indicated in FIG. 1.

During initial installation, cable 12 extends up through hollow pedestal A into housing B in a loop 12a which subsequently is cut for making connections to electronic components within housing B. Different kinds of electronic equipment may be installed within housing B depending on the type of communications services desired by individual customers.

Hollow pedestal A has top and bottom ends 20 and 22, a peripheral wall 24 that includes an outer peripheral surface, and a vertical passage 26 having a longitudinal axis 27. A pair of outwardly facing opposite vertical channels 30 and 32 extend the length of hollow pedestal A between top and bottom ends 20, 22 for receiving cables that extend from the electronics within housing B to a residence through a suitable trench.

Opposite generally horizontal ventilation recesses in the upper portion of hollow pedestal A adjacent top end 20 include an inclined recess upper wall 40 having a plurality of spaced-apart vent openings 42 therein to provide intake of ventilation air that circulates upwardly through housing B for discharge through exhaust vent openings generally indicated at 46 in the upper side portions of housing B. The flow of air ventilates housing B to cool electronic components therein and to minimize the buildup of condensation.

The internal surface of housing B has a plurality of vertical ribs circumferentially-spaced therearound, only four of which are indicated in FIG. 1 at 1, 2, 3 and 4. The bottom ends of the ribs provide support shoulders that are located to rest on top end 20 of pedestal A for supporting housing B thereon with housing bottom end 5 above vent openings 42.

Figure 3:
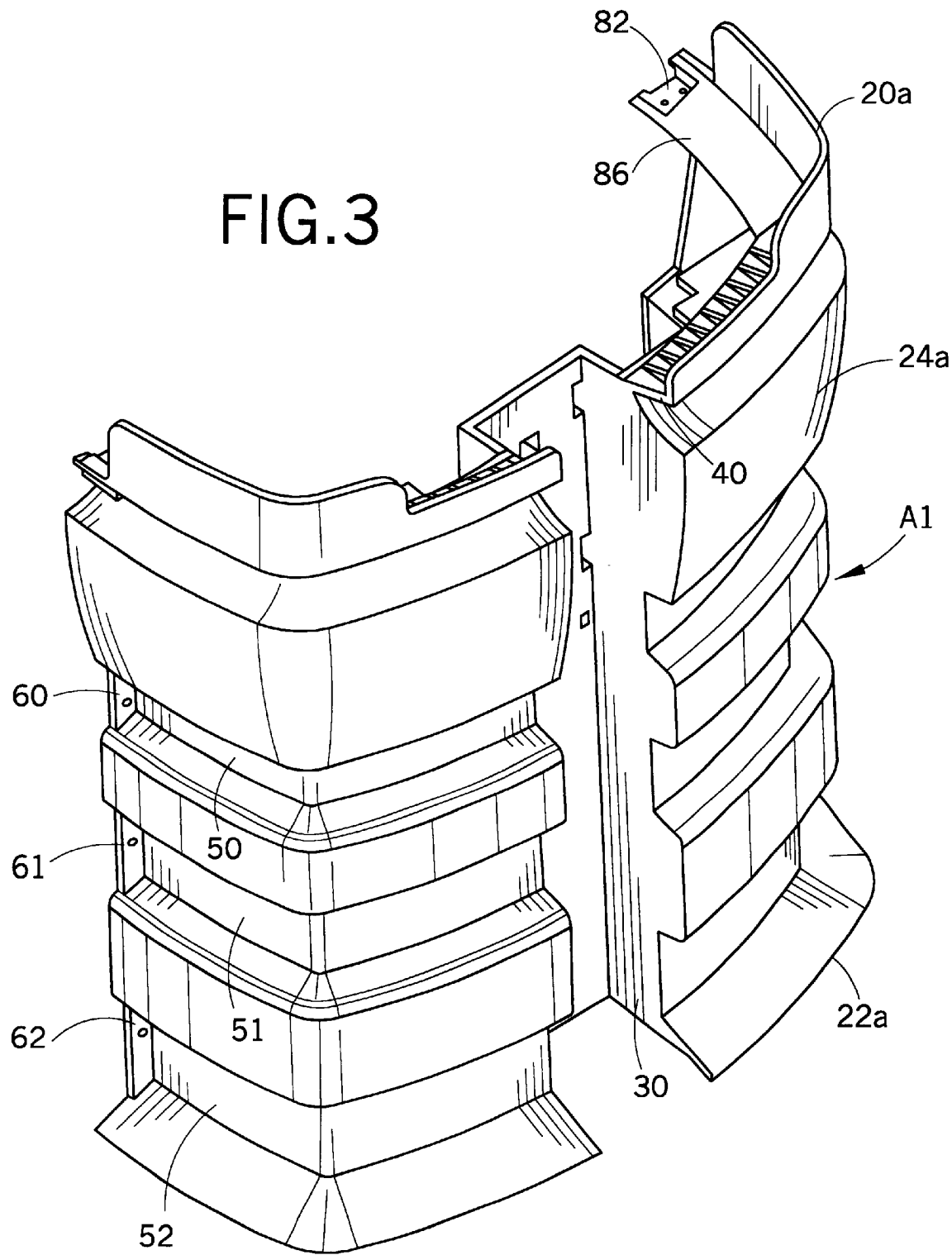
FIG. 3 is a perspective illustration of one longitudinal half of a pedestal that is completed by joining two of the longitudinal halves together.
Figure 4:
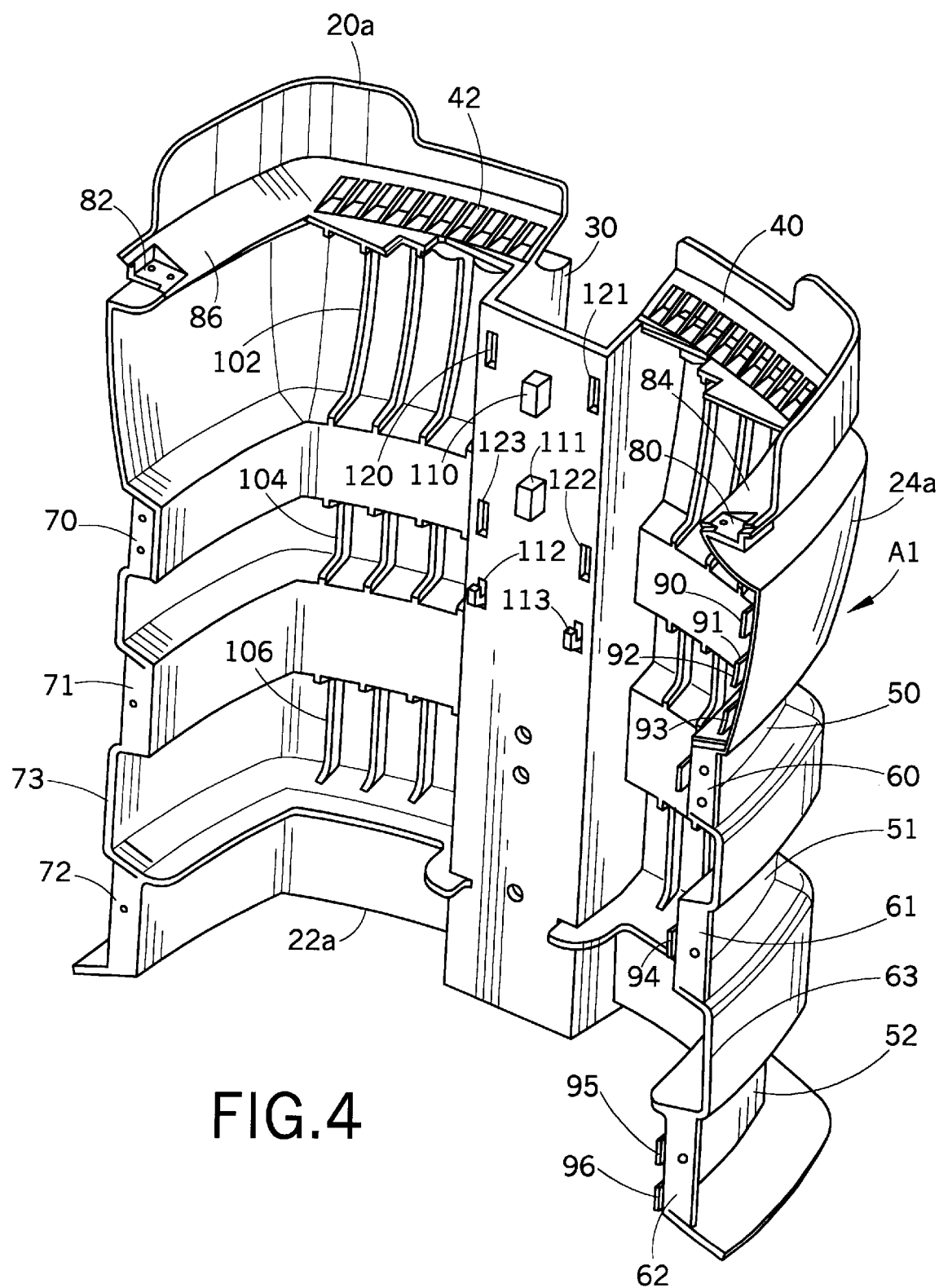
FIG. 4 is a perspective illustration of the interior of the longitudinal pedestal half of FIG. 3.
Figure 5:
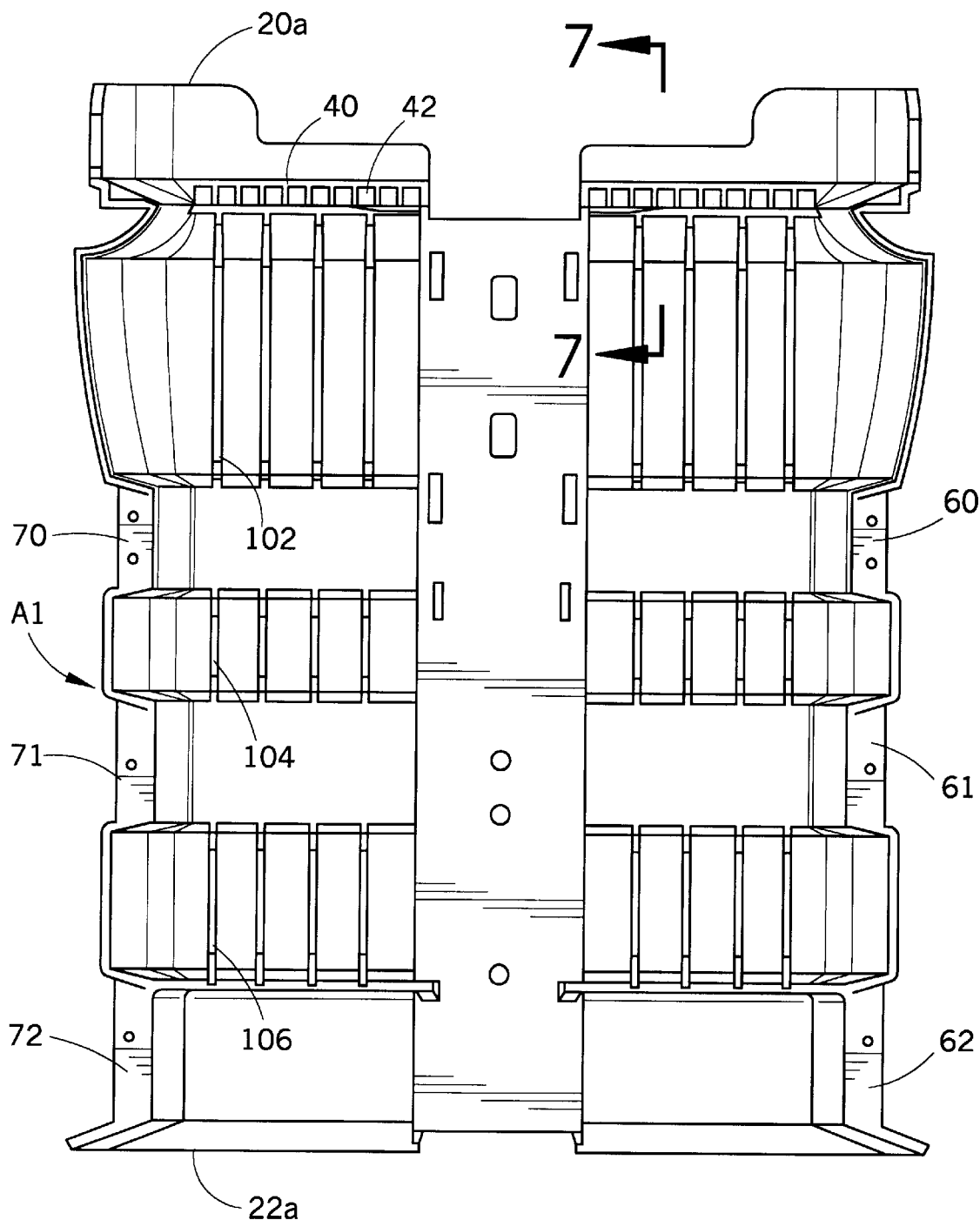
FIG. 5 is an elevational view looking at the interior of one longitudinal half of the pedestal.
Figure 6:
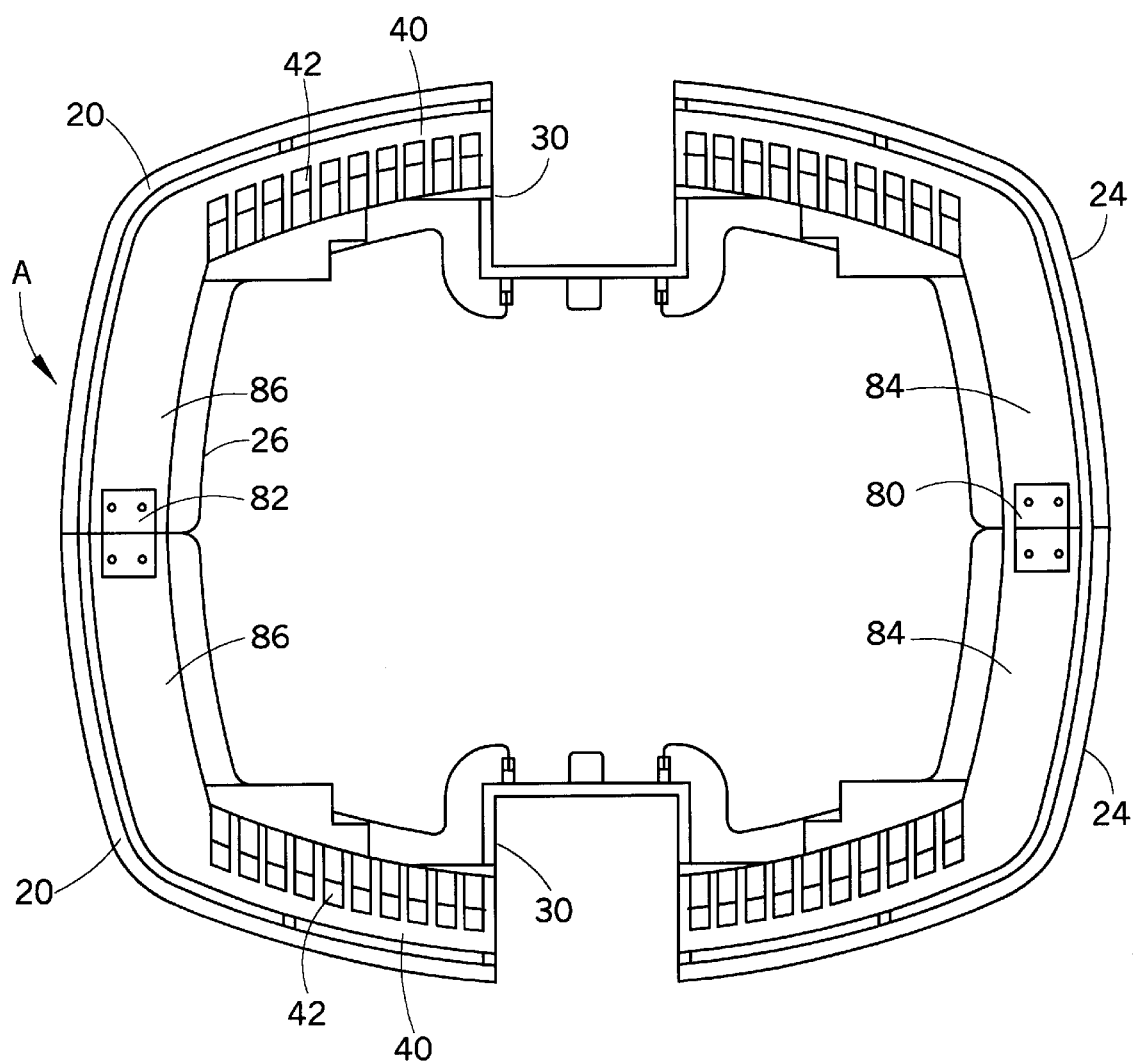
FIG. 6 is a top plan view of a pedestal in accordance with the present application that is formed by longitudinally joining two reversely positioned halves that are shown in FIGS. 3–5.

Hollow pedestal A is formed from two identical longitudinal half sections that are secured together along their vertical ends. One longitudinal half section A1 is shown and described with reference to FIGS. 3–5. The peripheral wall 24a of pedestal section A1 has a plurality of vertically-spaced circumferentially-extending recesses 50, 51 and 52 therein. Assembly flanges 60, 61 and 62 span the recesses along one longitudinal edge 63 of pedestal section A1 and extend generally radially of the longitudinal axis of an assembled pedestal. As shown in FIG. 5, assembly flanges 70, 71 and 72 span the recesses along the opposite longitudinal edge 73 of pedestal section A1. When two pedestal sections A1 are reversely positioned to be joined together, flanges 60 and 70, 61 and 71, and 62 and 72 abut one another. Suitable fasteners then are extended through the abutting flanges for joining the two pedestal sections together. Top and bottom ends 20a, 22a and peripheral wall 24a cooperate on two pedestal half sections to form the complete top and bottom ends 20 and 22, and peripheral wall 24 of pedestal A.

Flats 80, 82 are provided in opposite inclined upper walls 84, 86 adjacent the longitudinal edges of pedestal section A1. When a pair of pedestal sections are reversely positioned for being joined together, releasable latches span the joint between the two pedestal sections. The latches function to secure the pedestal sections together while providing means for securing top "B" to pedestal A.

A plurality of flat alignment tabs 90–96 are molded integrally with pedestal section A1 extending outwardly from the interior surface thereof adjacent one longitudinal edge 63. The alignment tabs are receivable within a reversely positioned adjacent pedestal section along longitudinal edge 73 thereof for maintaining alignment between the two sections as they are joined together.

A plurality of circumferentially-spaced generally vertical stiffening ribs are molded along the interior of the peripheral wall of the pedestal section, only three of which are indicated at 102, 104 and 106. Loops 110, 111 and hooks 112, 113 project inwardly from the backwall of channel 30 for use in tying cables or other components thereto. A plurality of holes 120–123 in the channel backwall receive snap retainers on a cover plate that closes channel 30.

Figure 7:
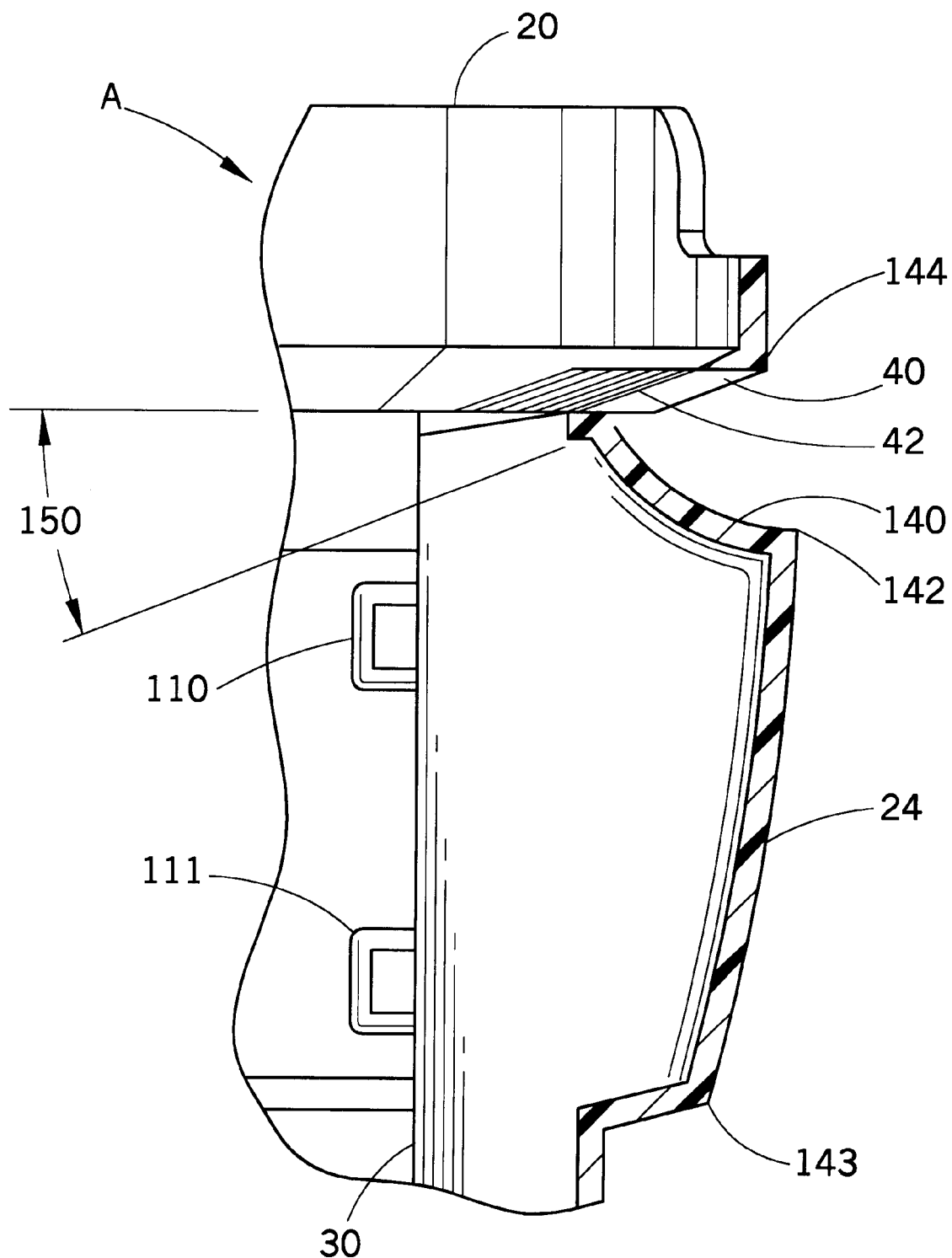
FIG. 7 is a partial cross-sectional elevational view taken generally on line 7—7 of FIG. 5.

As shown in FIG. 7, the ventilation recess in the peripheral wall of the pedestal has a curved recess lower wall 140 located below inclined recess upper wall 40 in which ventilation openings 42 are formed. Curved recess lower wall 140 intersects the outer periphery of pedestal A along an intersection 142 that is spaced outwardly from the intersection 144 between inclined recess upper wall 40 and the outer periphery of the pedestal. This provides better flow of air into vent openings 42 while minimizing entry of moisture or debris.

Inclined recess upper wall 40 is inclined downwardly from the horizontal at an angle 150 in FIG. 7 between 15–30° and more preferably between 20–25°. In a preferred arrangement, angle 150 has been made approximately 22°. The vertical size of the ventilation recess between intersections 142 and 144 is between 1.25–1.75 inches. The inclination of inclined recess upper wall 40 is such that the vertical projection of that wall at the vertical opening of the ventilation recess between intersections 142 and 144 takes up around 25–40% of the vertical extent of the recess opening.

Inclined recess upper wall 140 extends inwardly from intersection 144 a horizontal distance of 1.25–1.75 inches. Curved bottom wall 140 extends through an angle of 25–45° from intersection 142 to the intersection thereof with inclined recess upper wall 40. More preferably, the angle over which curved recess lower wall 140 extends is between 30–40°. Curved recess lower wall 140 is curved at a radius of 1.8–2.4 inches to enhance air flow into the vent openings while allowing moisture or debris contacting same to fall therefrom past intersection 142.

In one arrangement, intersection 144 is spaced approximately 2.5 inches below pedestal top end 20, and intersection 142 is spaced approximately 4.0 inches below top end 20. When the pedestal is buried, intersection 143 usually would be even with or spaced slightly above the earth surface. Internal vertical ribs 1–4 on housing B support the housing with its bottom end 5 located at or above intersections 144 between the recess upper wall 40 and the outer peripheral surface of the pedestal.

Pedestal A is generally rectangular in the arrangement shown although it will be appreciated that other shapes are possible. The vent openings are provided in opposite upper portions of the pedestal and on opposite sides of the external vertical channels therein.

Recess upper wall 40 has a length in a direction outwardly from the pedestal longitudinal axis, and the vent openings have an opening length in the same direction that is at least 65% of the recess upper wall length. Vent openings 42 have a width in a direction generally circumferential of the pedestal, and the vent opening length is at least two times the vent opening width.

Figure 2:
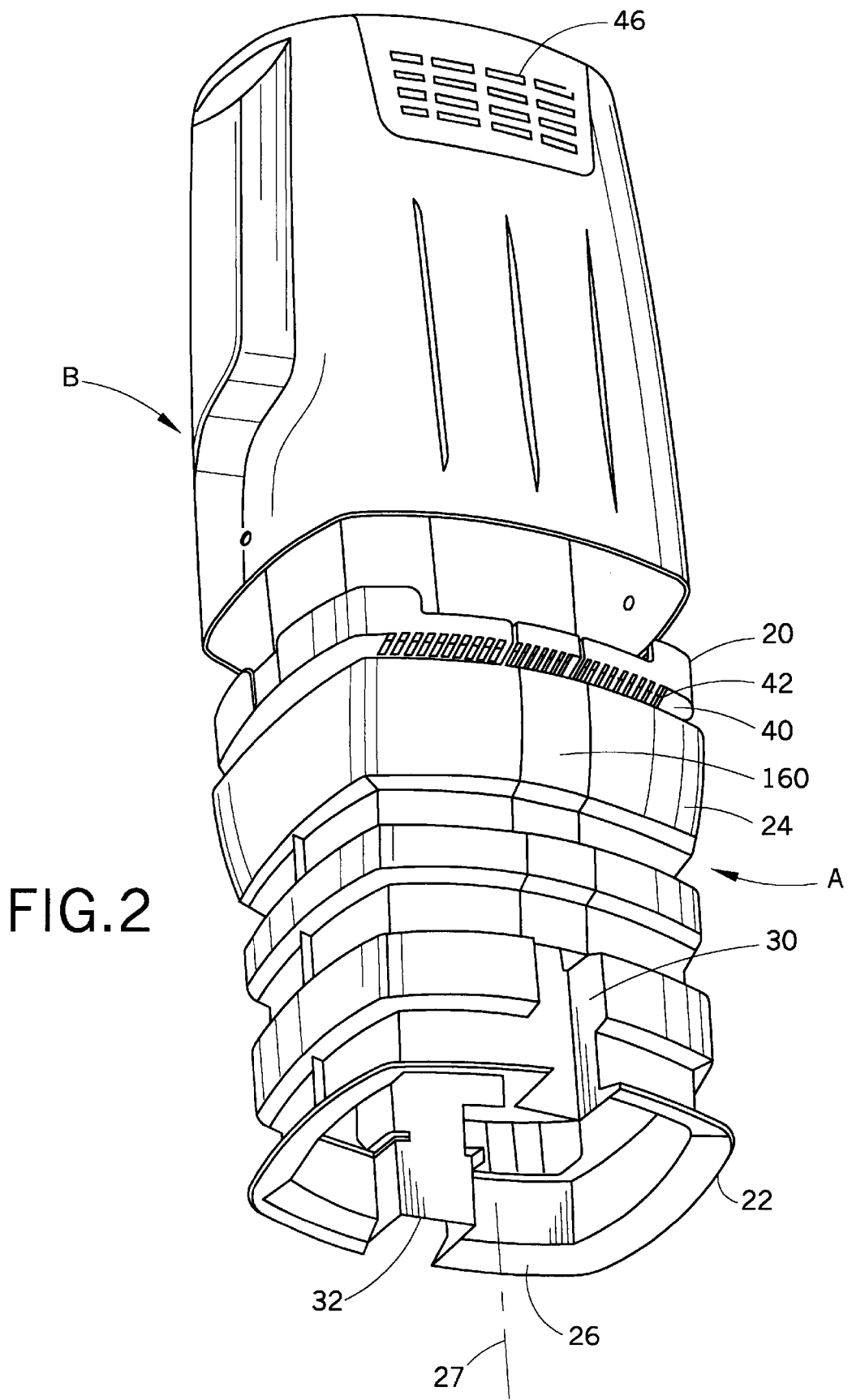
FIG. 2 is a perspective illustration of a pedestal in accordance with the present application and showing a housing of the type that is supported on the pedestal.

As shown in FIG. 2, the upper portion of external vertical channel 30 is closed by a molded plastic cover plate 160 having an exterior surface that is shaped to the configuration of the outer periphery of pedestal A. The cover plate includes a ventilation recess having vent openings therein to form a continuation of the vent recesses and vent openings in the pedestal on opposite sides of the external vertical channel.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A tubular pedestal for supporting a housing that encloses and protects electronic communications equipment and connections, said pedestal having top and bottom ends, a peripheral wall having an outer periphery, a longitudinal axis and a vertical passage extending between said top and bottom ends, an inwardly extending recess in said peripheral wall adjacent said top end, said recess having a downwardly facing recess upper wall and a recess lower wall, said recess upper wall having vent openings therein, and said recess lower wall being curved upwardly from said outer periphery to intersection with said recess upper wall.

2. The pedestal of claim 1 wherein said peripheral wall has a larger size at the intersection thereof with said recess lower wall than at the intersection thereof with said recess upper wall.

3. The pedestal of claim 1 wherein said recess upper wall slopes downwardly from the horizontal in a direction inwardly of said outer periphery at an angle between 15–30°.

4. The pedestal of claim 3 wherein said angle is between 20–25°.

5. The pedestal of claim 1 wherein the vertical size of said recess at the intersection thereof with said outer periphery is between 1.25–1.75 inches.

6. The pedestal of claim 1 wherein said recess forms a recess opening at said outer periphery and said recess opening has a recess opening vertical size, said recess upper wall being downwardly inclined inwardly from said outer periphery so that the vertical extent of said recess upper wall at said recess opening is 25–40% of said recess opening vertical size.

7. The pedestal of claim 1 wherein said recess upper wall extends inwardly from said outer periphery a horizontal distance between 1.25–1.75 inches.

8. The pedestal of claim 1 wherein said recess lower wall extends through an angle between 25–45°.

9. The pedestal of claim 8 wherein said angle is between 30–40°.

10. The pedestal of claim 9 wherein said recess lower wall is curved on a radius of between 1.8–2.4 inches.

11. The pedestal of claim 1 wherein said pedestal has a longitudinal axis and said recess upper wall has an upper wall length in a direction outwardly from said axis, and said vent openings having a vent opening length that is at least 65% of said upper wall length.

12. The pedestal of claim 11 wherein said vent openings have a vent opening width circumferentially of said axis and said vent opening length is at least two times said vent opening length.

* * * * *